United States Patent Office 3,230,269
Patented Jan. 18, 1966

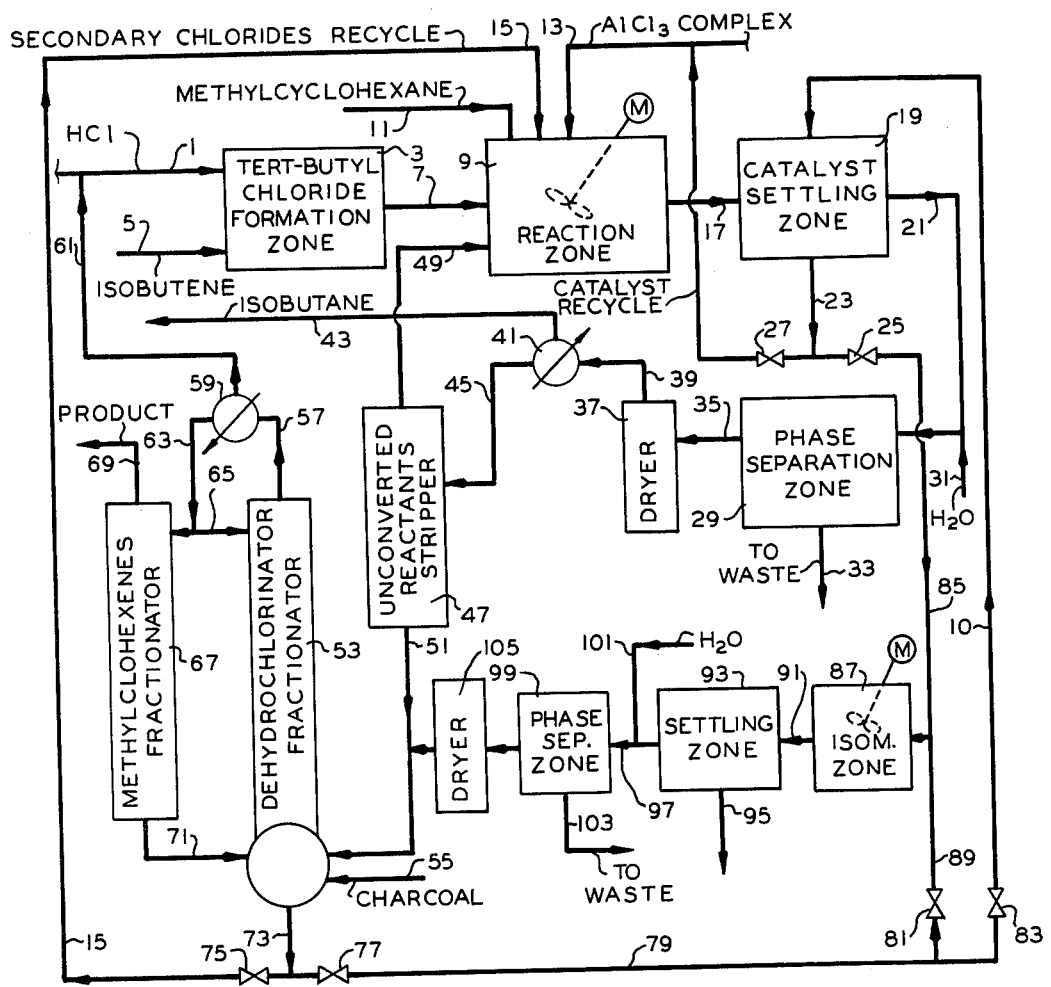

3,230,269
PRODUCTION OF TERTIARY OLEFINS
John E. Mahan and Carl W. Kruse, Bartlesville, Okla., assignors to Phillips Petroleum Company, a corporation of Delaware
Filed Oct. 25, 1962, Ser. No. 233,014
2 Claims. (Cl. 260—666)

This invention relates to a method for the production of tertiary alkyl and cycloalkyl halides. In one aspect, the invention relates to a method for the production of tertiary olefins. In another aspect, the invention relates to a method for the isomerization of secondary alkyl and cycloalkyl halides to tertiary alkyl halides. In another aspect, the invention relates to a method for increasing the yield of tertiary alkyl and cycloalkyl halides prepared by the reaction of tertiary butyl halides or tertiary amyl halides with an alkane or cycloalkane containing a tertiary carbon atom.

A number of methods have been proposed for the preparation of tertiary alkyl halides and tertiary cycloalkyl halides. Most of these methods involve a halogen exchange reaction wherein an alkane or cycloalkane containing a tertiary carbon is reacted with a tertiary alkyl halide, usually of lower molecular weight. For example, the reaction of tertiary butyl chloride with methylcyclohexane yields a mixture of isobutane, 1-methyl-1-chlorocyclohexane, unreacted tertiary butyl chloride and unreacted methylcyclohexane.

While certain of these tertiary halides are useful as such, they are more often employed as starting materials for the production of tertiary olefins (defined herein as those olefins in which at least one of the doubly bonded carbon atoms is attached to three carbon atoms). While the halogen exchange reaction is very specific and provides fairly high yields of desired tertiary halides, some secondary halides are produced, probably by isomerization. The tertiary halide can then be subjected to dehydrohalogenation conditions so that HX is removed and the corresponding tertiary olefin is formed. However, the reaction of methylcyclohexane or the like with a tertiary alkyl halide, such as tertiary butyl chloride, produces a mixture comprising tertiary halides and secondary halides. The conditions which cause dehydrohalogenation of tertiary alkyl halides do not necessarily result in the dehydrohalogenation of the secondary alkyl halides. When tertiary olefins such as 1-methylcyclohexene and methylenecyclohexane are the desired product, the production of these secondary halides decreases the ultimate yield of the olefin to a substantial degree.

It has now been found that secondary alkyl and cycloalkyl halides are isomerized to tertiary alkyl and cycloalkyl halides in the presence of an aluminum chloride·hydrocarbon complex.

It is an object of the invention to provide a method for the production of tertiary alkyl and cycloalkyl halides.

It is another object of the invention to provide a method for the isomerization of secondary alkyl and cycloalkyl halides to tertiary alkyl or cycloalkyl halides.

Yet another object of the invention is to improve the yield of tertiary alkyl halides in the reaction of an alkane or cycloalkane containing a tertiary carbon atom with a tertiary butyl halide or a tertiary amyl halide.

It is another object of the invention to provide an improved method for the production of tertiary olefins.

These and other objects of the invention will be apparent to those skilled in the art upon reading the accompanying disclosure, appended claims and drawing.

These and other objects of the invention are broadly accomplished by the isomerization of secondary alkyl or cycloalkyl halides in the presence of an aluminum trichloride·hydrocarbon complex under isomerization conditions.

In one embodiment of the invention, an improved method is provided for the production of tertiary alkyl or cycloalkyl halides comprising contacting a tertiary alkyl halide with an alkane or cycloalkane having a tertiary carbon atom in the presence of an aluminum trichloride·hydrocarbon complex in a reaction zone and introducing into said reaction zone a secondary alkyl halide isomeric with the tertiary halide of said alkane or cycloalkane and having the same carbon skeleton.

In other aspects of the invention, methods are provided for the production of tertiary olefins comprising recovering an effluent from the above described reaction zone containing a mixture comprising tertiary alkyl halides and secondary alkyl halides, introducing said mixture into a dehydrohalogenation zone under reaction conditions selected so as to dehydrohalogenate said tertiary alkyl halide and produce a tertiary olefin which is then recovered as a product but under conditions which do not substantially effect dehydrohalogenation of said secondary alkyl halides, removing said secondary halides from said dehydrohalogenation zone and either recycling same to the reaction zone or subjecting said secondary halides to isomerization conditions as hereinafter described and then recycling the resulting tertiary halides to the dehydrohalogenation zone. In still another aspect, the catalyst is separated from the reactor effluent and the hereinbefore described secondary halides are recycled to the catalyst separation zone.

Although the tertiary alkyl halide may be any alkyl halide which is capable of a halogen exchange reaction with the alkane or cycloalkane, it is most desirable that the boiling point of the tertiary alkyl halide product be significantly different than those of the unconverted reactants from which it is desired to be separated. Therefore, it is generally preferred that the tertiary alkyl halide reactant be selected from the group consisting of tertiary butyl halides or tertiary amyl halides. Preferably the halogen is chlorine or bromine with preferred compounds being tertiary butyl chloride and tertiary amyl chloride. Furthermore, the use of tertiary butyl chloride is preferred since the isobutane resulting from the chlorine exchange has been found to suppress such side reactions as alkylation and disproportionation.

The alkane or cycloalkanes reacted with the tertiary alkyl halide are those which produce in a halogen exchange reaction an alkyl or cycloalkyl halide having from 5 to 30 carbon atoms and at least one secondary position and at least one tertiary position on adjacent carbon atoms. Suitable compounds include the following: isopentane, 2-methylpentane, 2,4-dimethylhexane, 2-methyl-5-ethylheptane, 2,4,6,8-tetramethylnonane, 2,2,3,5,5-pentamethylheptane, 3-ethyl-5-n-propyl-7,7-dimethyltridecane, 5,5,7,7-tetramethyl-8-n-hexyl-11-n-butylhexadecane, methylcyclobutane, methylcyclopentane, ethylcyclobutane, methylcyclohexane, 4,4-dimethyl-1-n-butylcyclohexane, methylcyclooctane, 1,5,9-trimethylcyclododecane, 5-cyclohexyldodecane, 2-methyl-4-cyclohexyl-5-methyl-5-ethyleicosane and the like. Methylcyclohexane is presently preferred.

Thus, it may be said that the secondary alkyl halides employable herein are those alkyl halides and cycloalkyl halides containing from 5 to 30 carbon atoms per molecule and having a tertiary position and a secondary position to which the halogen is attached which is adjacent said tertiary carbon or is separated from said tertiary positions only by secondary carbon atoms.

It has now been found that these resultant $C_5$ to $C_{30}$ tertiary alkyl and cycloalkyl halides resulting from the above-described reaction are readily isomerized under the reaction conditions to said secondary alkyl halides. The formation of tertiary halides is a halogen exchange reaction which is in equilibrium, e.g., (1) 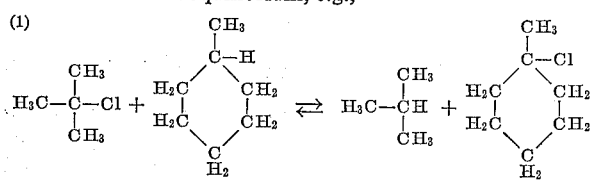

Tertiary butyl chloride    Methylcyclohexane    Isobutane    1-methyl-1-chlorocyclohexane (2) 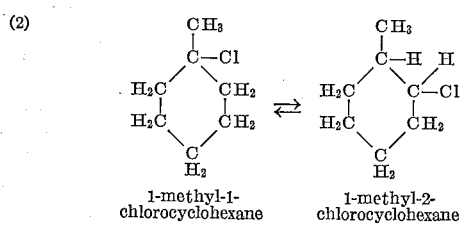

1-methyl-1-chlorocyclohexane    1-methyl-2-chlorocyclohexane

If a secondary halide of the type produced in said reaction is introduced into said reaction zone containing an AlCl₃·hydrocarbon complex, the yield of tertiary alkyl halides is increased, probably due to a shift in the isomerization equilibrium thereby suppressing formation of additional secondary alkyl halides. The isomerization can be carried out as a separate step after or during the halogen exchange process. The secondary halide may be either recycle or fresh material.

The aluminum chloride complex which is employed in the process of this invention generally contains from 55 to 65 weight percent aluminum trichloride with the remainder being a hydrocarbon. In these complexes, the aluminum chloride is complexed with rather high molecular weight hydrocarbons which result from the reaction of the aluminum chloride with isobutane or other branched paraffins in the presence of olefins such as ethylene.

The invention is best described with a simplified illustration of the production of 1-methyl-1-chlorocyclohexane by the reaction of tertiary butyl chloride with methylcyclohexane; however, the invention is not to be so limited.

The ratio of the alkane or cycloalkane to the tertiary alkyl halide on a molecular basis is generally within the range of between about 0.5:1 and 3:1. The amount of aluminum chloride complex catalyst present during the halogen exchange step or during the isomerization step is generally within the range of between about 0.5 to 10:0 weight percent, preferably between about 1.0 and about 6 percent by weight of the total hydrocarbon-tertiary alkyl halide mixture. Generally, the amount of secondary halide charge to the halogen exchange reaction zone will range from 0.25 to 0.5 mole per mol of alkane or cycloalkane charged, although an excess of the secondary halide is within the scope of the invention and would result in an increase in the yield of tertiary halide. Generally, the halogen exchange reaction is carried out in a liquid phase system, preferably at temperatures below 100° F., more perferably between 25 and 100° F. The contact time is relatively short, generally less than 5 minutes, more preferably between 0.05 and 2 minutes. The pressure within the halogen exchange reaction zone is sufficient to maintain reaction mixture in the liquid phase and is generally within a range of between atmospheric and 500 p.s.i.g. or more. The halogen exchange reaction can be carried out either batchwise or continuous.

Although the exact mechanism for the improvement in yield of the tertiary alkyl halides or the exact mechanism for the isomerization of the secondary alkyl halides to tertiary alkyl halides is unknown, it is believed that the initial reaction between tertiary butyl chloride and methylcyclohexane produces a 1-methyl-chlorocyclohexane and that the secondary chlorides are then produced by isomerization of the tertiary chloride. It has been shown herein that pure tertiary alkyl chloride when contacted with aluminum chloride complex catalyst isomerizes to yield a mixture of the tertiary and secondary alkyl chlorides. Thus an equilibrium isomerization mixture is obtained. It is then possible to improve the yield of tertiary chlorides and to suppress the formation of additional secondary chlorides by a recycle, or the introduction of secondary chlorides to the initial chlorination step wherein methylcyclohexane is reacted with tertiary butyl chloride.

In carrying out the isomerization process of the invention, a secondary alkyl halide is contacted with the previously described aluminum chloride complex catalyst under isomerization conditions, preferably the same conditions of time, temperature and pressure as described for the halogenation step. The isomerization itself can be effected in a separate isomerization zone or it can be utilized through a recycle of the secondary alkyl halides to the halogen exchange zone. In either case, since both the tertiary and secondary halides boil in a very narrow range, it is extremely difficult to separate between these two by such physical separation means as fractionation. In the copending application of C. W. Kruse and G. C. Ray, Serial No. 207,080, filed July 2, 1962, it has been shown that an olefinic compound may be prepared by contacting a dehydrohalogenatable hydrocarbon halide with at least partially oxidized particulate carbonaceous material produced by subjecting a particulate conventionally activated carbonaceous material to free oxygen-containing gas at a temperature of 300–700° C. for a period of time ranging from about 1 second to about 1 hour. This dehydrohalogenation, when carried out at a temperature in the range of from 125 to 200° C., is substantially selective for the dehydrohalogenation of tertiary halides and does not effect significant dehydrohalogenation of secondary halides at these conditions. Thus, it is possible to employ the dehydrochlorination step as a means for making the desired product, such as 1-methylcyclohexene, and also as a method for separation of secondary and tertiary halides.

The invention is best described by reference to the accompanying drawing. In the drawing, hydrogen chloride is fed via line 1 to tertiary butyl chloride formation zone 3 maintained at −20° C. and 5 to 10 p.s.i.g. Simultaneously, isobutene is fed to zone 3 through line 5 in a 1 to 1 mol ratio. We do not wish to limit ourselves to such a method of operation, since this formation of tertiary butyl chloride can be avoided, although for purposes of economy, the reaction of HCl and isobutene to form tertiary butyl chloride can be conducted rapidly at high yield to form the chlorine-supplying reactant employed in this invention. Since HCl is given off from the dehydrochlorination step in a later stage, the HCl can be continuously recycled through these portions of the process. The tertiary butyl chloride from zone 3 is passed via line 7 to reaction zone 9. Two mols of methylcyclohexane per mol of tertiary butyl chloride and 2 weight percent of aluminum chloride complex are fed simultaneously to zone 9 through lines 11 and 13, respectively and maintained therein at 25° C. for about 40 seconds. Simultaneously, a finite amount of secondary methylcyclohexyl chlorides are charged to zone 9 through line 15. These chlorides are recycled from the dehydrochlorination step of the process. The amount of secondary chlorides which are charged to this reaction zone will depend, for the most part, on the conditions being used in reaction zone 9. The equilibrium mixture of tertiary chlorides and secondary chlorides can vary depending on the reaction temperature used during chlorination. Thus, at two different temperatures, different amounts of secondary chlorides are necessary to suppress the formation of additional secondary chlorides. The resulting reaction mixture, containing 1-methyl-1-chlorocyclohexane, secondary methylcyclohexyl chlorides, aluminum chloride complex, unconverted methylcyclohexane and unreacted tertiary butyl chloride, along with isobutane which is formed as the other product in the chlorine exchange reaction, passes via line 17 to catalyst settling zone 19. The reaction effluent separates into two phases in this zone in about 5 minutes, and the hydrocarbon phase is withdrawn from zone 19 via line 21. The catalyst phase is withdrawn from zone 19 through line 23. With valve 25 closed and valve 27 open, this catalyst can be recycled to line 13 and zone 9. If desired, this catalyst phase can be discarded without recycle. The hydrocarbon phase in line 21 enters phase separation zone 29. Immediately prior to entering this zone, a sufficient amount of water is charged through line 31 to line 21 to deactivate the catalyst remaining in the phase. This mixture enters zone 29, wherein the hydrocarbon and aqueous phases separate, and the aqueous phase is withdrawn through line 33 to waste. The hydrocarbon phase then passes through line 35 to dryer 37, which can be a bed of adsorbent material such as bauxite which will remove the last traces of water from the mixture. This mixture then passes via line 39 to heater 41 wherein sufficient heat is applied to insure the flashing off of isobutane in the mixture, e.g., 30° C. The isobutane is removed via line 43 and can be returned to a dehydrogenation zone for conversion to isobutene. This dehydrogenation zone is not shown. If such a dehydrogenation zone is used, further economy can be obtained since the isobutene from the dehydrogenation zone could then be recycled to the tertiary butyl chloride formation step.

The remaining hydrocarbon phase then passes via line 45 to unconverted reactants stripper 47. In this stripper, the unconverted methylcyclohexane and tertiary butyl chloride are stripped off at an overhead temperature of 110° C. and sent via line 49 as recycle to chlorination zone 9. These two reactants are still in the same approximate ratio as they were originally charged, so the direct recycle should not upset the balance of reactants in zone 9. The remaining material, a mixture of tertiary and secondary methylcyclohexyl chlorides, passes via line 51 to the kettle of dehydrochlorinator-fractionator 53. Simultaneously, activated charcoal is charged to the kettle of this vessel via line 55. The temperature in this kettle is maintained at about 150° C. which effects the dehydrochlorination of the 1-methyl-1-chlorocyclohexane, but does not effect the dehydrochlorination of the secondary chlorides. Since the temperature in the column is above the boiling point of methylcyclohexane and HCl, these materials pass off overhead through line 57 to condenser 59. In this condenser, the methylcyclohexenes are condensed at about 90° C. and are thus separated from the HCl. The HCl is then passed through line 61 as recycle to line 1 and formation zone 3. The liquid from condenser 59, a mixture composed primarily of methylcyclohexenes with some 1-methyl-1-chlorocyclohexane passes via lines 63 and 65 to methylcyclohexenes fractionator 67. The 1-methyl-1-chlorocyclohexane present in this mixture is from the recombination of HCl and methylcyclohexenes within condenser 59 and this is limited to a minor amount. Within fractionator 67, these two materials are separated at an overhead temperature of about 115° C., and the product, methylcyclohexene, is withdrawn as overheads via line 69. Line 65 was provided so that the liquid stream from condenser 59 could be split, sending part of the stream as feed to fractionator 67 and part as reflux to fractionator 53. The amount of liquid in each of these streams will be determined by the specific operating conditions of the fractionators and the exact conditions being used therein. The bottoms from fractionator 67, methylcyclohexyl chlorides, is withdrawn via line 71 and returned to the kettle of vessel 53. As dehydrochlorination proceeds, the concentration of secondary methylcyclohexyl chlorides increases in the kettle of vessel 53 and these compounds are withdrawn through line 73. Valves 75 and 77 are provided so that these secondary chlorides can be recycled to either the reaction zone or to a separate isomerization zone or to the catalyst settling zone. The system is manifolded such that either one or any combination of two or three of these recycle streams can be utilized. Thus, with valve 77 closed and valve 75 open, the secondary chlorides pass via line 73, valve 75 and line 15 to reaction zone 9. The presence of these secondary chlorides in the reaction zone suppresses the formation of new secondary chlorides as previously described. With valve 75 closed and valve 77 open, the secondary chlorides pass via line 79 to a valve manifold comprising valves 81 and 83. With valve 27 closed and valve 25 open, the settled catalyst phase from zone 19 passes through line 23, valve 25 and line 85 to isomerization zone 87. Simultaneously, the recycled secondary chlorides pass through valve 81 and line 89 to this isomerization zone. The conditions within this zone are identical with the conditions employed in the halogen exchange reaction zone in most cases, however, while the general conditions set forth for halogen exchange and isomerization earlier cover the ranges in which we operate, it is to be understood that the halogen exchange and isomerization zones can be operated at different conditions within this range. For example, we may wish to operate the isomerization zone at a temperature of 50 to 100° F. higher than the halogen exchange zone. The reaction mixture from zone 87, containing aluminum chloride complex catalyst, tertiary chlorides and secondary chlorides passes via line 91 to settling zone 93. In this zone, the phases separate as in zone 19, and the catalyst phase is removed via line 95. This catalyst phase can be discarded at this point. The hydrocarbon phase passes through line 97 to phase separation zone 99. Water is introduced to line 97 via line 101 so that mixing of the water with the hydrocarbon phase is adequate to insure the quenching of the final traces of catalyst. The hydrocarbon and aqueous phases separate in zone 99, and the aqueous phase is removed via line 103 to waste. The remaining material, a mixture of tertiary and secondary chlorides then passes via dryer 105 and line 51 to the kettle of vessel 53 for recycle through the dehydrochlorination and fractionating steps.

In another alternate method of operation valve 81 is closed, valve 83 is open, and the secondary chlorides from vessel 53 pass through lines 73, valve 77, line 79, valve 83 and line 10 to catalyst settling zone 19. There is sufficient catalyst in zone 19 to effect isomeriaztion of the secondary chlorides, and in view of the time required to effect settling of the phases of this zone, sufficient time at room temperature is provided to isomerize a considerable portion of the secondary chlorides to tertiary chlorides. In this method of operation, the isomerized mixture then is handled along with the reaction mixture from zone 9 in the manner previously described.

While the above description has been particularly devoted to the isomerization of secondary chlorides resulting from the reaction of tertiary butyl chloride with methylcyclohexane, it should be pointed out that the processes of this invention can be employed for the isomerization of secondary alkyl halides as herein defined from any process. For example, the chlorination of methylcyclohexane with elemental chlorine will produce a mixture of primary, secondary and tertiary chlorides. There will be very little primary chloride present, but the secondary chloride will comprise by far the major amount of the reaction mixture. One could then subject this mixture to the action of aluminum chloride complex catalyst, and thus isomerize large amounts of these secondary chlorides to the tertiary chlorides.

The following specific examples are intended to illustrate the advantages of this invention, but it is not intended that the invention be limited to the specific embodiments shown therein.

EXAMPLE I

A run was carried out in which a mixture of tertiary and secondary methylcyclohexyl chlorides was contacted with aluminum chloride complex.

The aluminum chloride complex used contained 58 weight percent aluminum chloride, the remainder being hydrocarbon. This complex was obtained from a commercial diisopropyl unit wherein isobutane is alkylated with ethylene in the presence of aluminum chloride. The complex catalyst had been stabilized by heating to 140° F. to remove dissolved HCl and low boiling hydrocarbons.

In this run, a 29 gram portion of mixed methylcyclohexyl chlorides, containing 0.022 mole of 1-methyl-1-chlorocyclohexane and 0.128 mole of secondary methylcyclohexyl chlorides was diluted with 29 grams of cyclohexane. The solution was shaken for 1 minute at room temperature with 1 gram of aluminum chloride complex, after which 3 more grams of the catalyst was added, and the agitation was continued for another minute. The catalyst was allowed to settle for approximately 10 seconds, the oil phase was decanted, and the oil was then washed with water. The isomerized mixture contained 28.2 grams cyclohexane, 8 grams (0.061 mole) of 1-methyl-1-chlorocyclohexane and 10.8 grams (0.082 mole) of secondary methylcyclohexyl chlorides. The gain of 0.039 mole of the tertiary chloride and loss of 0.046 mole of secondary chlorides show that an 85 percent yield of the tertiary chloride was obtained at 36 percent conversion of the secondary chlorides.

EXAMPLE II

Two runs were carried out in which secondary chlorides were recycled to the chlorination step in which methylcyclohexane was reacted with tertiary butyl chloride. As shown in this example, the recycling of the secondary chlorides suppressed the formation of additional secondary chlorides.

In these runs, methylcyclohexane was reacted with tertiary butyl chloride in a continuous fashion in a loop reactor. The reactor employed was constructed from a stainless steel centrifugal pump. A glass reservoir was connected to the pump and was charged with a mixture comprising methylcyclohexane, tertiary butyl chloride, 1-methyl-1-chlorocyclohexane and secondary methylcyclohexyl chlorides. Another glass reservoir was charged with aluminum chloride complex described in Example I. Nitrogen gas was introduced above the chloride-hydrocarbon solution to maintain the desired pressure, and the rate of flow of this solution into the reactor was controlled through an exit valve. A higher nitrogen pressure was maintained above the catalyst reservoir to assure no backup through the needle valve which was used to regulate the rate of catalyst addition. The reactants were admitted to a tube loop connecting the outlet of the pump to its intake. The reactants were admitted to the loop near the pump inlet, and the products were withdrawn near the exit side of the pump.

The solutions containing the hydrocarbon and chlorides were passed through the reactor at 100–200 ml./min., thus the reaction time in each run was from 0.5 to 1.0 minute. The rate of catalyst addition was such to maintain approximately 3 to 5 weight percent of the complex in the reaction zone based on the chloride-hydrocarbon mixture. The effluent from each run was collected in a receiver which was cooled in Dry Ice, and the receiver vent was connected to a trap cooled with Dry Ice. The cool reactor effluent was decanted from the complex catalyst, and the hydrocarbon phase was then washed with water.

The hydrocarbon phase was then analyzed by gas-liquid chromatography. The analyses were run on a Perkin-Elmer 154–D chromatographic instrument. The columns used were 2 foot squalane on Celite and a 2 meter silver nitrate-glycol on Celite. The results of these runs are expressed below as Table I. Included in Table I are several runs in which no secondary chlorides were charged to the chlorination zone. In Table I, the yields in Runs 1, 4 and 5 were calculated on the basis of tertiary butyl chloride, the yield in Run 3 was calculated on the basis of methylcyclohexane, and the yield in Run 2 was calculated on either reactant.

*Table I*

PREPARATION OF MCH* CHLORIDES IN LOOP REACTOR

| Run No. | Charge | | | | | Products | | | |
|---|---|---|---|---|---|---|---|---|---|
| | MCH (Moles) | t-BuCl (Moles) | 1-Cl-MCH (Moles) | Sec-Cl-MCH (Moles) | $AlCl_3$ Complex (Wt. percent) | 1-Cl MCH | | Sec-Cl MCH | |
| | | | | | | (Moles Net) | (Percent Yield) | (Moles Net) | (Percent Yield) |
| 1 | 6.12 | 3.06 | | | 5.3 | 1.18 | 38 | 1.0 | 33 |
| 2 | 5.0 | 5.0 | | | 3.5 | 1.2 | 24 | 0.9 | 18 |
| 3 | 3.98 | 6.08 | | | 3.4 | 1.02 | 26 | 0.67 | 17 |
| 4 | 4.33 | 1.03 | .075 | 1.3 | 4.5 | .71 | 69 | 0.14 | 13.5 |
| 5 | 1.5 | .75 | .11 | .64 | 2.8 | .44 | 59 | −0.12 | −16 |

*MCH=methylcyclohexane.

In Table I, Runs 1, 2 and 3 are control runs, while Runs 4 and 5 represent runs within the scope of the new isomerization process of this invention. It can be seen that the yield of the 1-chloro compound (tertiary chloride) is much higher in each of Runs 4 and 5 than in the control runs. Similarly, the amount of secondary chlorides is decreased considerably in these runs. In fact, in Run 5, there was a net loss of secondary chlorides which illustrate the isomerization of secondary chlorides which are recycled to the reaction zone as such.

The tertiary methylcyclohexyl chloride produced in the above runs was dehydrochlorinated in good yield over activated charcoal at approximately 150° C. Yields of from 70 to 93 percent per pass were obtained.

While certain examples, structures, compositions and process steps have been described for purposes of illustration, the invention is not limited to these. Variations and modifications within the scope of the disclosure and the claims can readily be effected by those skilled in the art.

We claim:

1. A method for the production of a tertiary olefin which comprises halogenating a $C_5$ through $C_{30}$ alkylcycloalkane having a secondary and tertiary position on adjacent carbon atoms with a tertiary alkyl halide selected from the group consisting of tertiary butyl halides and tertiary amyl halides in a halogenation zone having a temperature in the range of 25° to 150° F. and a pressure of atmospheric to 500 p.s.i.g. and sufficient to maintain the reactants in the liquid phase in the presence of an aluminum trichloride-hydrocarbon complex containing from 55 to 65 weight percent aluminum trichloride, recovering from said halogenation zone a mixture containing a tertiary alkylcycloalkyl halide and a secondary alkylcycloalkyl halide, introducing said mixture into a dehydrohalogenation zone containing a partially oxidized particulate carbonaceous material under reaction conditions comprising a temperature in the range of 125° to 200° C. sufficient to dehydrohalogenate said tertiary alkyl cycloalkyl halide and produce therefrom a mixture of a tertiary cycloolefin and a secondary alkylcycloalkyl halide, separating and removing said secondary alkylcycloalkyl halide from said mixture, and returning same to said halogenation zone thereby increasing the ultimate yield of tertiary olefin otherwise obtained 2. A method for the production of 1-methylcyclohexene-1 which comprises halogenating 1-methylcyclohexane with tertiary butyl chloride in a halogenation zone having a temperature in the range of 25 to 150° F. and a pressure of atmospheric to 500 p.s.i.g. and sufficient to maintain the reactants in the liquid phase in the presence of an aluminum trichloride·hydrocarbon complex containing from 55 to 65 weight percent aluminum trichloride, recovering from said halogenation zone a mixture containing 1 - methyl - 1 - chlorocyclohexane and 1-methyl-2-chlorocyclohexane, introducing said mixture into a dehydrogenation zone having present therein activated charcoal under reaction conditions comprising a temperature in the range of 125° to 200° C. sufficient to selectively dehydrohalogenate said 1 - methyl - 1 - chlorocyclohexane and produce therefrom a mixture of 1-methylcyclohexene-1 and 1-methyl-2-chlorocyclohexane, separating said 1-methyl-2-chlorocyclohexane from said mixture and returning same to said halogenation zone thereby increasing the ultimate yield of said 1-methylcyclohexene-1 otherwise obtained.

References Cited by the Examiner
UNITED STATES PATENTS

| | | | |
|---|---|---|---|
| 2,156,070 | 4/1939 | Stern et al. | 260—666 |
| 2,474,827 | 7/1949 | Condon. | |
| 2,490,973 | 12/1949 | Leonard et al. | 260—666 |
| 2,613,233 | 10/1952 | Blumer | 260—677 |

FOREIGN PATENTS

| | | |
|---|---|---|
| 535,435 | 4/1941 | Great Britain. |

OTHER REFERENCES

Thomas: "Anhydrous Aluminum Chloride in Organic chemistry" (1941), pp. 48–62.

LEON ZITVER, *Primary Examiner.*